(12) United States Patent
Lai et al.

(10) Patent No.: US 11,402,309 B1
(45) Date of Patent: Aug. 2, 2022

(54) TESTING EQUIPMENT OF DYNAMIC PENETRATION PLATE ANCHOR FOR HYPERGRAVITY CENTRIFUGES

(71) Applicant: Zhejiang University, Hangzhou (CN)

(72) Inventors: Ying Lai, Hangzhou (CN); Bin Zhu, Hangzhou (CN); Yunmin Chen, Hangzhou (CN); Chuan Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/582,014

(22) Filed: Jan. 24, 2022

(30) Foreign Application Priority Data

Mar. 22, 2021 (CN) .......................... 202110302281.6

(51) Int. Cl.
*G01N 3/06* (2006.01)
*B63B 21/26* (2006.01)

(52) U.S. Cl.
CPC ............. *G01N 3/066* (2013.01); *B63B 21/26* (2013.01); *B63B 2021/262* (2013.01); *G01N 2203/0037* (2013.01); *G01N 2203/0232* (2013.01); *G01N 2203/0635* (2013.01); *G01N 2203/0676* (2013.01)

(58) Field of Classification Search
CPC ........... G01N 3/066; G01N 2203/0037; G01N 2203/0232; G01N 2203/0635; G01N 2203/0676; B63B 21/26; B63B 2021/262

USPC .......................................................... 73/426
See application file for complete search history.

(56) References Cited

FOREIGN PATENT DOCUMENTS

| CN | 101839815 A | * | 9/2010 | |
|---|---|---|---|---|
| CN | 101839815 A | | 9/2010 | |
| CN | 103234830 A | * | 8/2013 | |
| CN | 108169005 A | * | 6/2018 | ............... G01N 3/02 |
| CN | 108426572 A | * | 8/2018 | |
| CN | 108426572 A | | 8/2018 | |

\* cited by examiner

*Primary Examiner* — Marrit Eyassu
(74) *Attorney, Agent, or Firm* — WPAT, PC

(57) ABSTRACT

A testing equipment of dynamic penetration plate anchor for a hypergravity centrifuge includes five parts: a test model box, a magnetic induction positioning system, an anchor release device, a loading and measuring device and a dynamic penetration plate anchor. A test foundation is disposed in the test model box, the top part of the test model box along a lengthwise direction is provided with a slide rail of model box, the anchor release device and the loading and measuring device are installed on the slide rail of model box, and the magnetic induction positioning system is installed on the anchor plate of the dynamic penetration plate anchor and the test model box. It can solve the problem that movement information of the anchor body is difficult to obtain due to opaque soil, and can accurately and effectively carry out tests of dynamic penetration plate anchors of hypergravity centrifuges.

4 Claims, 5 Drawing Sheets

TESTING EQUIPMENT OF DYNAMIC PENETRATION PLATE ANCHOR FOR HYPERGRAVITY CENTRIFUGES

TECHNICAL FIELD

The invention relates to testing equipment and method of plate anchors in hypergravity centrifuges, and in particular to testing equipment and method of dynamic penetration plate anchor for a hypergravity centrifuge.

BACKGROUND

China has a sea area of 3 million square kilometers, and abundant energy reserves such as oil and gas, wind power and tidal energy. At present, the proposal of "a maritime power strategy" has promoted the exploitation of oil and gas resources in China to gradually enter the deep water area of the South China Sea, which also puts forward higher requirements for the deep water mooring system of offshore oil production platforms. With the increasing water depth, offshore oil production platform is transformed from traditional fixed platforms to new structures such as TLP (Tension Leg Platform) and floating production, storage and offloading device (FPSO), and the foundation form is also developed from large-diameter single pile to drag anchor and vertically loaded anchor. Dynamic penetration plate anchor is a kind of plate anchor installed by penetration in the form of free fall. It has the advantages of light weight, material saving, recyclability and high efficiency (the ratio of the bearing capacity over the anchor weight), and low installation costs. It is one of the preferred alternatives of deep-sea anchoring system in the future.

The dynamic penetration plate anchor is a deep foundation type developed from the torpedo anchor and plate anchor. In other word, the anchor penetrates into the seabed by its self-weight. The prediction of the performance of the dynamic penetration plate anchor are evaluated from the following three aspects: (1) the dynamic penetration depth, (2) the embedding track and burial depth in the dragging process, and (3) the loss of penetration depth in the process of "keying" (adjusting the plate anchor orientation to make the anchor line perpendicular to the anchor plate), (4) bearing capacity of plate anchor at its final installation depth.

How to obtain the motion of the dynamic penetration plate anchor during installation is essential to explore the above four key issues are explored experimentally, including the impact speed of the anchor body during penetration, the penetration depth, the trajectory and final embedment depth during dragging, the trajectory and orientation change of the anchor during keying and loading, etc. However, due to the invisibility of soil, it is difficult to accurate obtain the movement of anchor in the process of penetration in the natural soil test.

SUMMARY

In order to solve the problems existing in the background, the invention provides a testing equipment and method for dynamic penetration plate anchor. The device can be used to simulate the installation, loading and service process of dynamic penetration plate anchor, especially to measure the impact speed, penetration depth, trajectory and embedment depth in the dragging, "keying" and loading process.

The device of the invention can measure all the six-degree-of-freedom of the anchor by the magnetic induction positioning system, and completely solves the technical difficulty that the motion information of the anchor is difficult to accurately measure in natural soil due to the invisibility of soil.

To solve the technical problems, the invention adopts the following technical scheme:

the testing equipment may include five parts: a test model box, a magnetic induction positioning system, an anchor release device, a loading and measuring device and a dynamic penetration plate anchor; the test model box contains test soil, and the top part of the test model box in the longitudinal direction (lengthwise direction) is arranged with a slide rail of model box (also referred to as model box slide rail); the anchor release device as well as the loading and measuring device are installed on the slide rail of model box; the dynamic penetration plate anchor and the loading and measuring device are connected by an anchor line, and the magnetic induction positioning system is attached on the dynamic penetration plate anchor and the test model box.

The anchor release device may include a guide tube, a spring, a guide tube support and a finger cylinder; the guide tube support is slidably mounted on the slide rail of model box through a base slide block, the upper part of the guide tube and the upper part of the guide tube support are hinged, and the lower part of the guide tube is hinged horizontally and slidable on the lower part of the guide tube support through a horizontal sliding trail; the lower end of the guide tube is opened, and the side wall of the upper end of the guide tube is provided with an opening; the finger cylinder is fixed on the upper part of the guide tube support through a bracket, and the pneumatic clamping jaws of the finger cylinder are located at the opening of the guide tube, and the pneumatic clamping jaws are closable to clamp and fix the dynamic penetration plate anchor; the spring is arranged between the upper end of the dynamic penetration plate anchor and the inner top surface of the guide tube.

The loading and measuring device may include a loading frame, a variable frequency motor, a force sensor and a pulley; the variable frequency motor is installed in the loading frame, and the loading frame is mounted on the slide rail of model box through the bracket slide block; the output shaft of the variable frequency motor and one end of the anchor line is fixed, and the force sensor is connected in the middle of the anchor line; the pulley is disposed in the loading frame and under the variable frequency motor; the other end of the anchor line sequentially winds through the pulley, enters the guide tube of the anchor release device and connects with the anchor padeye of the dynamic penetration plate anchor.

The magnetic induction positioning system is placed in the test model box and includes a magnetic source, a miniature magnetic induction sensor, and a data processing and control circuit; the magnetic source is fixed above the upper port of the test model box, and the miniature magnetic induction sensor is fixed on the dynamic penetration plate anchor, the miniature magnetic induction sensor and the magnetic source are both connected to the data processing and control circuit, and the data processing and control circuit is connected to a data terminal computer and a power supply individually.

In an embodiment, the lower part of the guide tube is hinged horizontally and slidable on the lower part of the guide tube support through the horizontal sliding trail; specifically that: a strip groove is provided in the middle of the horizontal sliding trail, the strip groove is engaged with a convex block on the guide tube support, and an end of the horizontal sliding trail is hinged with the guide tube.

In an embodiment, the test model box is a cuboid box made of polymethyl methacrylate (PMMA).

In an embodiment, the test model box is installed and fixed on the bottom of a hanging basket of the hypergravity centrifuge.

The invention mainly consists of the test model box equipped with the slide rail, the anchor release device, the magnetic induction positioning system, the loading and measuring device and the dynamic penetration plate anchor. The anchor release device is installed at the upper part of the test model box and used for releasing dynamic penetration plate anchor. After the dynamic penetration plate anchor is released, it penetrates into the test soil in the test model box at a certain impact velocity. The miniature magnetic induction sensor is installed on the surface of the dynamic penetration plate anchor, which can measure the six-degree-of-freedom motion information of the dynamic penetration plate anchor in real time. The loading and measuring device loads the orientation of the dynamic penetration plate anchor after the penetration completed.

The invention is intended for the test of the dynamic penetration plate anchor, and may be used for the full-cycle test simulation of the installation and service process of the dynamic penetration plate anchor. Magnetic induction positioning system can obtain the trajectory, orientation and velocity of dynamic penetration plate anchor in the test process, and can continuously detect six-degrees-of-freedom motion of dynamic penetration plate anchor in real time.

Compared with that prior art, the invention has the beneficial effects that:

1. the invention adopts the magnetic induction positioning system, which can track all the six-degrees-of-freedom motion of the dynamic penetration plate anchor in real time. It solves the difficulty to obtain the trajectory of the anchor during the test due to the invisibility of the soil, and especially contributes to the measurement of the penetration depth of the anchor, the dragging trajectory during the dragging process, the penetration depth loss in the "keying" process and the change of the anchor orientation.

2. the test data obtained by the magnetic induction positioning system can be simply processed to obtain the velocity of the dynamic penetration plate anchor in the embedding process, which is helpful for the development of related tests to study the impact velocity and penetration depth.

Figure 1:
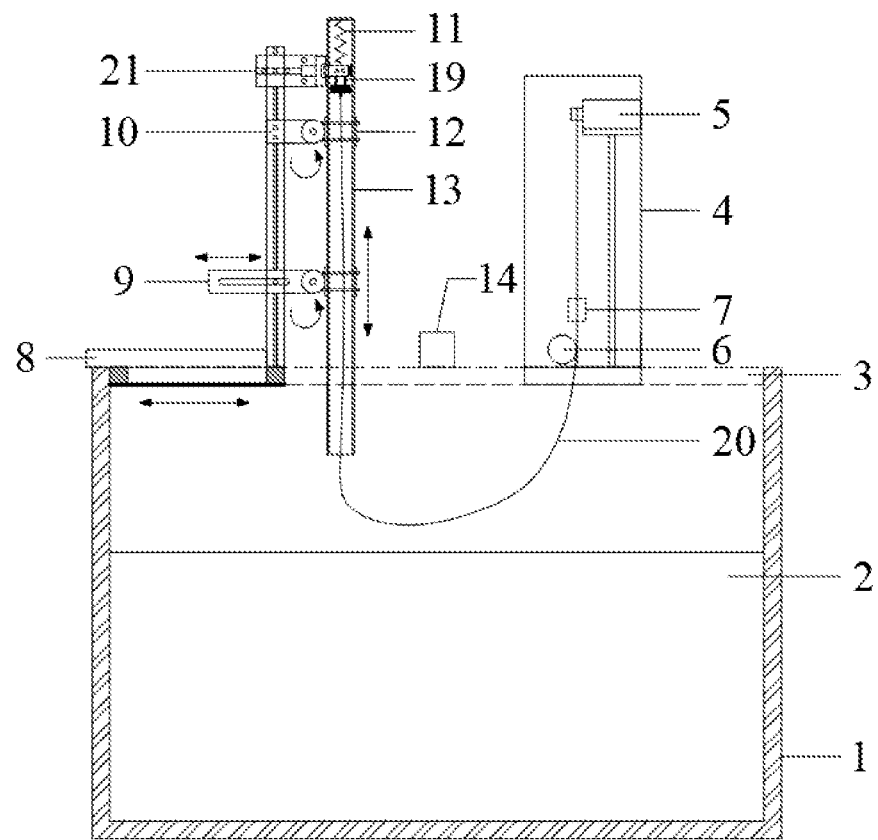
FIG. 1 is a schematic diagram of a testing equipment of the invention.

Description of reference numerals is that 1: test model box, 2: test soil, 3: slide rail of model box, 4: loading and measuring device, 5: variable frequency motor, 6: pulley, 7: force sensor, 8: anchor release device, 9: horizontal sliding trail, 10: guide tube support, 11: spring, 12: fixture, 13: guide tube, 14: magnetic source, 15: miniature magnetic induction sensor, 16: data processing and control circuit, 17: data terminal computer, 18: power supply, 19: dynamic penetration plate anchor, 20: anchor line, 21: finger cylinder.

DETAILED DESCRIPTION OF EMBODIMENTS

The invention will be further explained with reference to the drawings and examples below.

As shown in FIG. 1, the testing equipment exemplarily includes five parts: the test model box 1, the magnetic induction positioning system, the anchor release device 8, the loading and measuring device 4 and the dynamic penetration plate anchor 19; the test model box 1 is a cuboid box made of high-strength polymethyl methacrylate; there is test soil 2 in the test model box 1; the top part of the test model box 1 in the long side direction is provided with the slide rail 3 on which the anchor release device 8 and the loading and measuring device 4 are installed; the anchor release device 8 and the loading and measuring device 4 slide along the slide rail 3 of the test model box; the dynamic penetration plate anchor is connected with the loading and measuring device through the anchor line, and magnetic induction positioning system is installed on the dynamic penetration plate anchor 19 and the test model box 1.

The anchor release device 8 is installed on the upper part of the test model box 1 through the slide rail 3 of model box, and its position on the test model box can be changed through the slide rail.

The anchor release device 8 comprises the guide tube 13, the spring 11, guide tube support 10 and the finger cylinder 21; the guide tube support 10 is slidable on the slide rail 3 of model box through the base slide block, the upper part of the guide tube 13 is hinged with the upper part of the guide tube support 10, and the lower part of the guide tube 13 is hinged horizontally and slidable on the lower part of the guide tube support 10 through the horizontal sliding trail 9; the upper part of the guide tube 13 is clamped by the fixture 12, and the upper fixture 12 is hinged to the upper part of the guide tube support 10; the low part of the guide tube 13 is clamped by the fixture 12, and the lower fixture 12 is hinged on the horizontal sliding trail 9; the lower end of the guide tube 13 is arrange with an opening, and the sidewall of the upper end of the guide tube 13 is arranged with an opening; the finger cylinder 21 is fixed on the upper part of the guide tube support 10 through the bracket, and the pneumatic clamping jaw of the finger cylinder 21 is located at the opening of the guide tube 13, and the closed pneumatic jaw can clamp the dynamic penetration plate anchor 19; the spring (11) can be connected between the upper end of the dynamic penetration plate anchor 19 and the inner top surface of the guide tube 13;

the lower part of the guide tube 13 is hinged horizontally and slidable on the lower part of the guide tube support 10 through the horizontal sliding trail 9. Specifically, the strip groove is provided in the middle of the horizontal sliding trail, the strip groove is embedded with the convex block on the guide tube support 10, and the end of the horizontal sliding trail 9 is hinged with the guide tube 13.

The spring 11 is installed at the top of the guide tube 13 to provide the initial speed for the dynamic penetration plate anchor 19.

The guide tube 13 can move up and down through the fixture 12 to control the falling distance of the dynamic penetration plate anchor, and the spring can also adjust the tightness; in this way, the impact speed of the dynamic penetration plate anchor is controlled by both spring and guide tube.

The horizontal sliding trail 9 adjusts the inclination angle of the guide tube support 10 by moving left and right to control the penetration direction of the dynamic penetration plate anchor.

The loading and measuring device 4 is installed on the upper part of the test model box 1 through the slide rail 3 of model box, and moves along the slide rail.

The loading and measuring device 4 includes the loading frame, the variable frequency motor 5, the force sensor 7 and the pulley 6; the variable frequency motor 5 is installed in the loading frame, and the loading frame is slidably mounted on the slide rail 3 of model box through the bracket slide block; the output shaft of the variable frequency motor 5 is connected with one end of the anchor line 20, and the force sensor 7 is connected in the middle of the anchor line 20; the pulley 6 is provided in the loading frame under the variable frequency motor 5; the other end of the anchor line 20 winds through the pulley 6, enters the guide tube 13 of the anchor release device 8 and connects with the anchor padeye of the dynamic penetration plate anchor 19;

In the loading and measuring device 4, the pulley 6 is installed on the upper part of the test model box 1 through the loading frame, and the loading angle of the anchor line 20 is changed by moving the loading and measuring device 4 on the slide rail 3; the variable frequency motor 5 is installed on the upper part of the loading frame, which can adjust the rotating speed to control the loading speed; the anchor line performs loading through the motor roller of the output shaft of the variable frequency motor 5, and the anchor line is connected with the force sensor 7 to measure the bearing capacity during the loading process.

Figure 2:
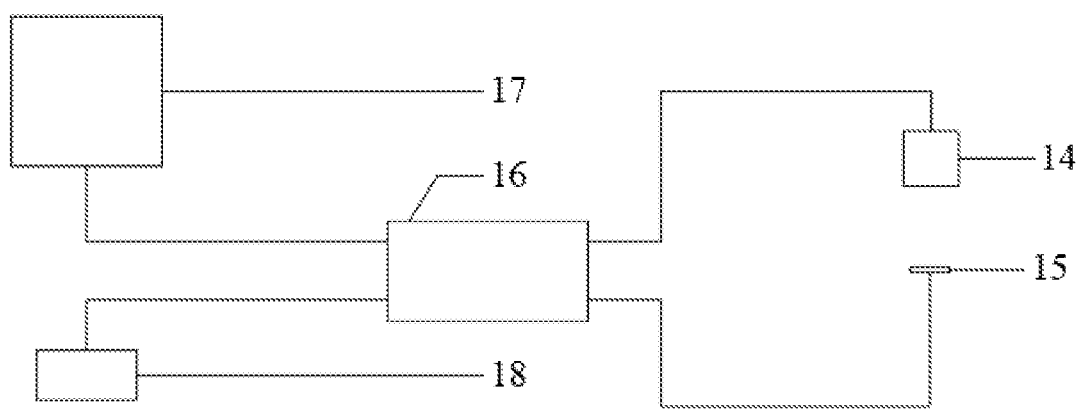
FIG. 2 is a schematic diagram of a magnetic induction positioning system.
Figure 3:
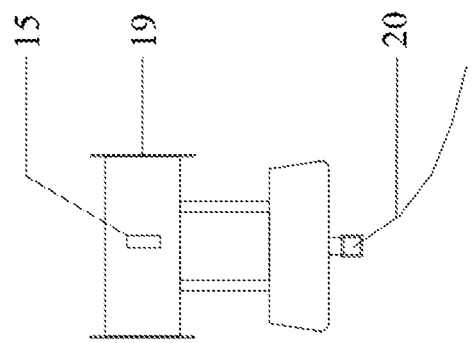
FIG. 3 shows a dynamic penetration plate anchor and a miniature magnetic induction sensor.

The magnetic induction positioning system is placed in the test model box 1 and includes the magnetic source 14, the miniature magnetic induction sensor 15, and the data processing and control circuit 16; the magnetic source 14 is fixed on the top of the upper port of the test model box 1, and as shown in FIG. 3, the miniature magnetic induction sensor 15 is fixed on the dynamic penetration plate anchor 19; as show in FIG. 2, the miniature magnetic induction sensor 15 and the magnetic source 14 are both connected to the data processing and control circuit 16, and the data processing and control circuit 16 are respectively connected to the data terminal computer 17 and the power supply 18.

In practice, the dynamic penetration plate anchor 19 is a flying wing anchor made of stainless steel, and the miniature magnetic induction sensor 15 is attached to the surface of the anchor body. The miniature magnetic induction sensor can measure the six-degrees-of-freedom movement of the flying wing anchor in real time, with data acquisition frequency at 1 Hz.

In practice, in the magnetic induction positioning system, the magnetic source 14 is installed on the upper part of the test model box through the epoxy resin cross bracket; the miniature magnetic induction sensor 15 has a transverse diameter within 2 mm and a longitudinal length within 10 mm, and is installed on the surface of the dynamic penetration plate anchor 19. The miniature magnetic induction sensor 15 can continuously and accurately measure the motion information of the six degrees of freedom of the dynamic penetration plate anchor 19, and can track and measure motion trajectory and speed change of the dynamic penetration plate anchor 19.

The miniature magnetic induction sensor can measure the six-degree-of-freedom motion with 1 Hz frequency about the dynamic penetration plate anchor. In the process of falling penetration of dynamic penetration plate anchor 19, the average velocity of the anchor in a certain stage can be obtained through the formula, t can be accurate to $\frac{1}{60}$ second, and the average speed can be measured at $\frac{1}{60}$ second.

FIG. 1 is a schematic diagram of the testing equipment of the invention. The impact velocity of dynamic penetration plate anchor can be controlled by adjusting spring tightness, guide tube support height, etc., which can be used for the correlation test between the impact velocity of anchor and penetration depth. By adjusting the horizontal sliding trail, the inclination of the guide tube can be controlled, and then the penetration angle of the dynamic penetration plate anchor into the soil can be controlled, which is used to simulate the directional stability in the process of its falling, and the influence of different angles of penetration on the penetration depth and the orientation of the anchor. The force sensor and the magnetic induction positioning system are turned on before the dynamic penetration plate anchor is released.

FIG. 2 shows the magnetic induction positioning system. The principle of the magnetic induction positioning system is that the data processing and control circuit generates control signals, and the magnetic source is an orthogonal three-axis coil, which is controlled by the control signals and emits electromagnetic fields around on the basis of time sharing. The magnetic sensor receives the electromagnetic field signal, transmits the data to the data terminal computer after A/D conversion, and data terminal computer calculates out the position and attitude information of the target object through the electromagnetic positioning algorithm, including the translation of the target in the X, Y and Z directions and the rotation around the three main axes.

FIG. 3 is a schematic diagram of the rear anchor of the miniature magnetic induction sensor attached and fixed on the dynamic penetration plate anchor.

Figure 4A:
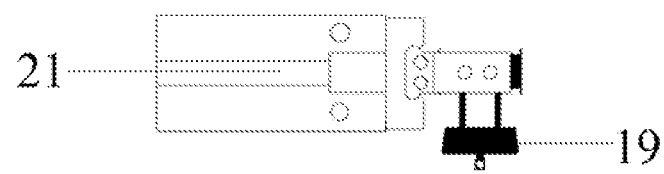
FIGS. 4A and 4B are a front view and a side view of a finger cylinder fixing a dynamic penetration plate anchor, respectively.
Figure 4B:
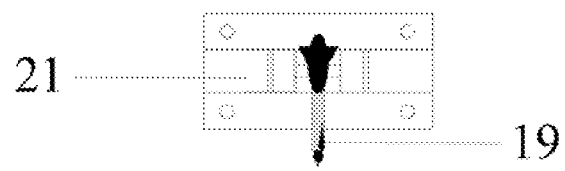

FIGS. 4A and 4B show the finger cylinder pneumatic clamping jaw clamping and fixing the dynamic penetration plate anchor. Before the test, the finger cylinder is ventilated to allow the finger cylinder pneumatic clamping jaw to clamp the dynamic penetration plate anchor and fix it on the top of the guide tube; during the test, ventilating the finger cylinder stops, the finger cylinder pneumatic clamping jaw immediately loosens, and the dynamic penetration plate anchor obtains an initial velocity through the compressed spring, thus completing the release process of the anchor body.

Figure 5:
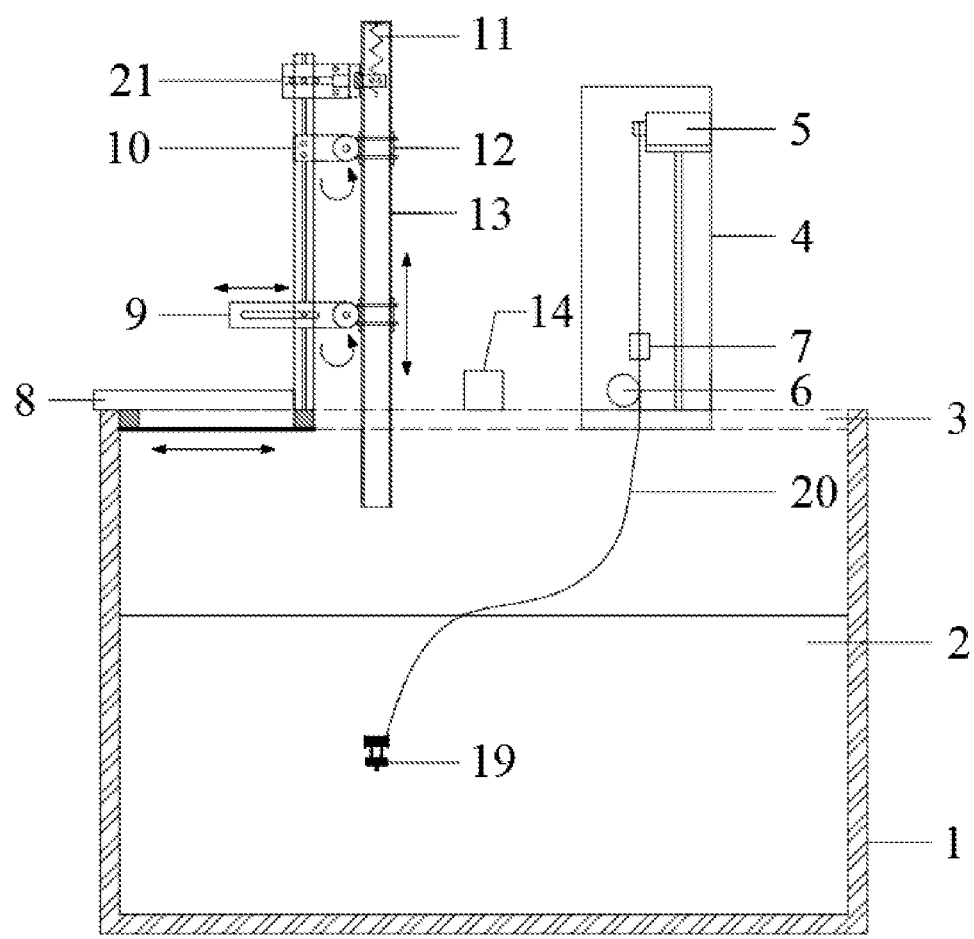
FIG. 5 is a schematic diagram of the penetration process for dynamic penetration plate anchor into test soil.
Figure 6:
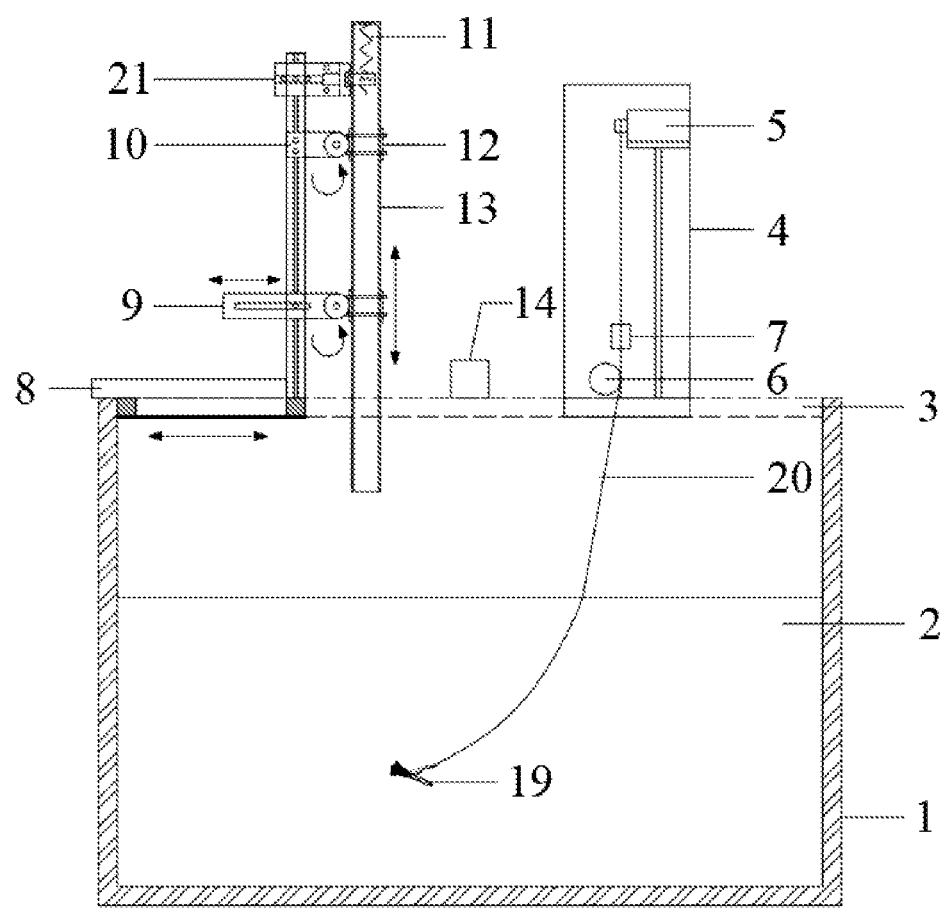
FIG. 6 is a schematic diagram of dragging process for dynamic penetration plate anchor.
Figure 7:
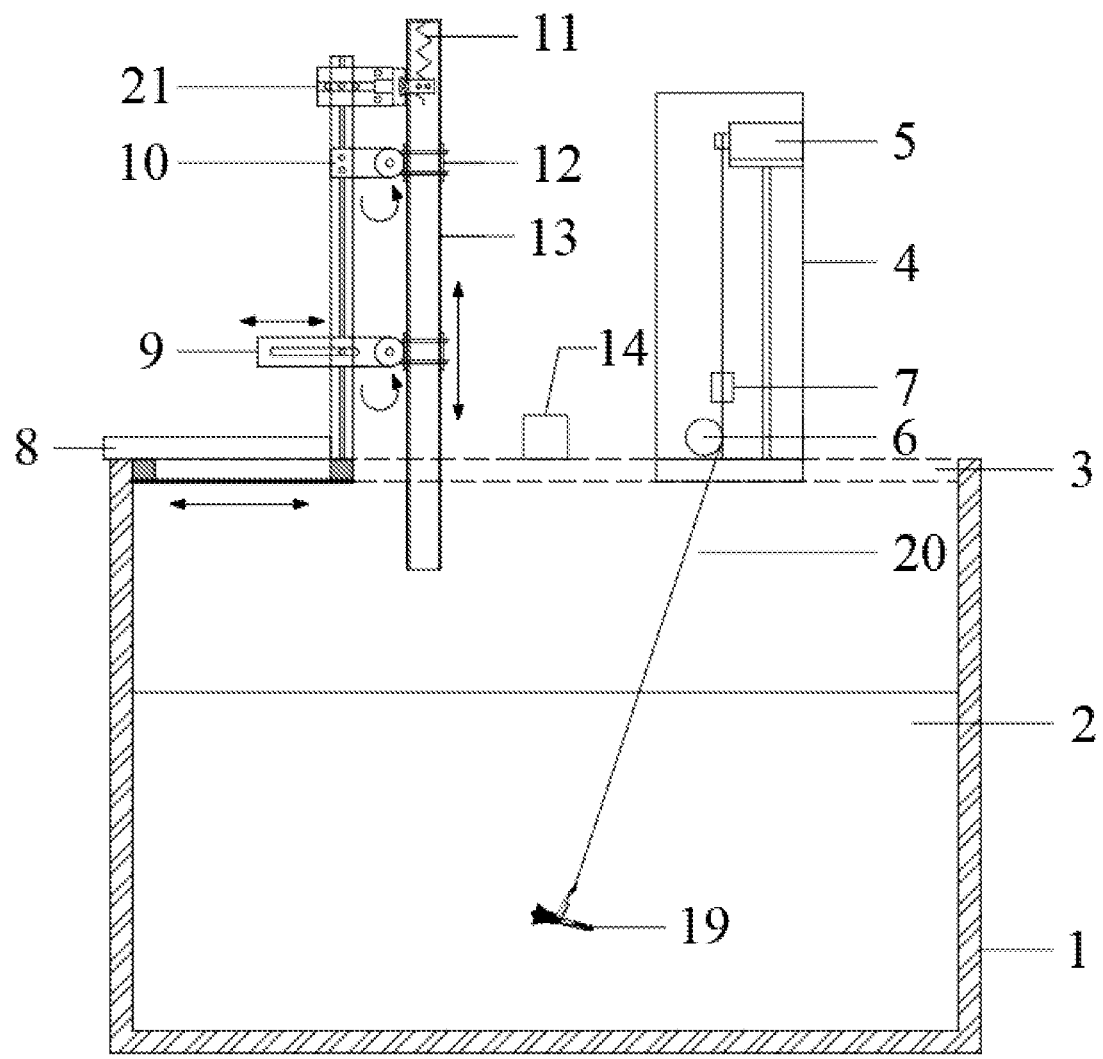
FIG. 7 is a schematic diagram of dynamic penetration plate anchor subjected with load.

FIG. 5-FIG. 7 show the process of penetration into the soil after the release of the dynamic penetration plate anchor. At this stage, the magnetic induction positioning system can obtain relevant test data such as the impact velocity, penetration trajectory and penetration depth of the anchor. FIG. 6 shows that after the penetration of the dynamic penetration plate anchor is completed, the loading and measuring device drags the anchor body and adjusts the anchor orientation, so that the anchor is basically perpendicular with the anchor line. At this stage, the magnetic induction positioning system can obtain the penetration depth loss and the anchor body orientation data in the "keying" process. FIG. 7 shows the dynamic penetration plate anchor under normal loading. The loading and measuring device can apply load to the anchor through the anchor line, the force sensor can obtain the bearing capacity of the anchor, and the magnetic induction positioning system can obtain the trajectory and orientation of the anchor body during the loading process.

The test process of the dynamic penetration plate anchor on the hypergravity centrifuge of the invention specifically includes the following steps (taking the sand foundation as an example):

S1, the model foundation is subjected to pour in the test model box by sand pourer method and lifting into the sand vacuum saturation tank for vacuum saturation; S2, after saturation of the foundation, the anchor release device, loading and measuring device, dynamic penetration plate anchor and magnetic induction positioning system are assembled as shown in FIG. 1. Among them, adjusting the height of the guide tube from the model foundation and the tightness of the spring can control the impact velocity of the dynamic penetration plate anchor, and adjusting the inclination angle of the guide tube can control the penetration direction of the anchor; S3, the model is hang into the hanging basket of the centrifuge, the finger cylinder is connected to the pneumatic valve of the centrifuge for ventilation, pneumatic clamping jaw clamps and fixes the dynamic penetration plate anchor, and the anchor line, force sensor, motor and various data transmission lines are connected; S4, the magnetic induction positioning system and centrifuge data acquisition software are turned on to confirm that each sensor can work normally; S5, the centrifuge accelerates to the pre-set acceleration value, and each sensor is started after the artificial gravity is stable. S6, the air pipe of the finger cylinder is closed; in this way, pneumatic clamping jaw immediately is released, and the anchor falls to the model foundation at a pre-set initial velocity, and then penetrates into the model foundation at the impact velocity, as shown in FIG. 5; with the magnetic induction positioning system, the movement information of the anchor can be obtained until its Z-direction displacement does not change; S7, the motor is turned on, and the anchor body rotates with the anchor line tentioned. As the tension of the anchor line continues to increase, the anchor shank begins to open, and the angle of the anchor shank gradually increases. Finally, the anchor plate and the anchor line form an angle about 90 degrees. This stage is the "keying" process of dynamic penetration plate anchor, as shown in FIG. 6. In this stage the magnetic positioning system can acquire the embedded depth loss of the anchor, the trajectory and orientation change process of the anchor in the "keying" process; and S8, after the "keying" process is completed, the motor continues to load, and the force sensor can get the ultimate load of dynamic penetration plate anchor.

The position and orientation of the anchor can be obtained directly from the software of the magnetic induction positioning system, and the velocity of the anchor can be calculated out by the formula $$v_t = \frac{v_t - v_{t-1}}{\Delta t}.$$

Similarly, the acceleration can also be obtained by the formula, and the accuracy can be as high as 1/60 of a second in terms of average velocity. In the test, the velocity and acceleration of the anchor during the release process can be calculated by the above algorithm.

Therefore, it can be seen from the above embodiments that the invention can solve the problem that it is difficult to obtain the movement information of the anchor body due to the invisibility of the soil, and provides an effective technical scheme for studying the relevant key scientific issues such as the penetration depth of the dynamic penetration plate anchor, the embedding trajectory and buried depth in the dragging process, the penetration depth loss and the bearing capacity in the "keying" process, etc.

The above specific embodiments are used to explain the invention, but not to limit it. Any modifications and changes made to the invention within the spirit of the invention and the scope of protection of the claims will fall within the scope of protection of the invention.

What is claimed is:

1. A testing equipment of dynamic penetration plate anchor for a hypergravity centrifuge, comprising: a test model box (1), a magnetic induction positioning system, an anchor release device (8), a loading and measuring device (4), and a dynamic penetration plate anchor (19);

wherein the test model box (1) is configured to accommodate a test soil (2), the test model box (1) is provided with a slide rail (3) of model box at a top part along a lengthwise direction, the anchor release device (8) and the loading and measuring device (4) are installed on the slide rail (3) of model box, the dynamic penetration plate anchor (19) and the loading and measuring device (4) are connected by an anchor line (20), and the magnetic induction positioning system is attached on the dynamic penetration plate anchor (19) and the test model box (1);

wherein the anchor release device (8) comprises a guide tube (13), a spring (11), a guide tube support (10) and a finger cylinder (21); the guide tube support (10) is slidably mounted on the slide rail (3) of model box, an upper part of the guide tube (13) is hinged with an upper part of the guide tube support (10), and a lower part of the guide tube (13) is hinged horizontally and slidable on a lower part of the guide tube support (10) through a horizontal sliding trail (9); a lower end of the guide tube (13) is opened, and a side wall of an upper end of the guide tube (13) is provided with an opening; the finger cylinder (21) is fixed on the upper part of the guide tube support (10), pneumatic clamping jaws of the finger cylinder (21) are located at the opening of the guide tube (13), and the pneumatic clamping jaws are closable to clamp and fix the dynamic penetration plate anchor (19); and the spring (11) is arranged between an upper end of the dynamic penetration plate anchor (19) and an inner top surface of the guide tube (13);

wherein the loading and measuring device (4) comprises a loading frame, a variable frequency motor (5), a force sensor (7), and a pulley (6); the variable frequency motor (5) is installed in the loading frame, the loading frame is mounted on the slide rail (3) of model box, an output shaft of the variable frequency motor (5) is connected with one end of the anchor line (20), a middle of the anchor line (20) is connected with the force sensor (7), the pulley (6) is arranged in the loading frame and below the variable frequency motor (5), and the other end of the anchor line (20) winds through the pulley (6) and enters the guide tube (13) of the anchor release device (8) and further connects with an anchor padeye of the dynamic penetration plate anchor (19);

wherein the magnetic induction positioning system comprises a magnetic source (14), a miniature magnetic induction sensor (15), and a data processing and control circuit (16); the magnetic source (14) is fixed above the upper part of the test model box (1), the miniature magnetic induction sensor (15) is fixed on the dynamic penetration plate anchor (19), both the miniature magnetic induction sensor (15) and the magnetic source

(14) are connected with the data processing and control circuit (16), and the data processing and control circuit is connected with a data terminal computer (17) and a power supply (18) individually.

2. The testing equipment of dynamic penetration plate anchor for a hypergravity centrifuge according to claim 1, wherein the lower part of the guide tube (13) is hinged horizontally and slidable on the lower part of the guide tube support (10) through the horizontal sliding trail (9), wherein a strip groove is provided in a middle of the horizontal sliding trail (9), the strip groove is engaged with a convex block on the guide tube support (10), and an end of the horizontal sliding trail (9) is hinged with the guide tube (13).

3. The testing equipment of dynamic penetration plate anchor for a hypergravity centrifuge according to claim 1, wherein the test model box (1) is a cuboid box made of polymethyl methacrylate (PMMA).

4. The testing equipment of dynamic penetration plate anchor for a hypergravity centrifuge according to claim 1, wherein the test model box (1) is installed and fixed at a bottom of a hanging basket of the hypergravity centrifuge.

* * * * *